April 18, 1933.  L. D. SOUBIER  1,904,961
MACHINE FOR FORMING HOLLOW GLASSWARE
Filed June 19, 1931   5 Sheets-Sheet 1
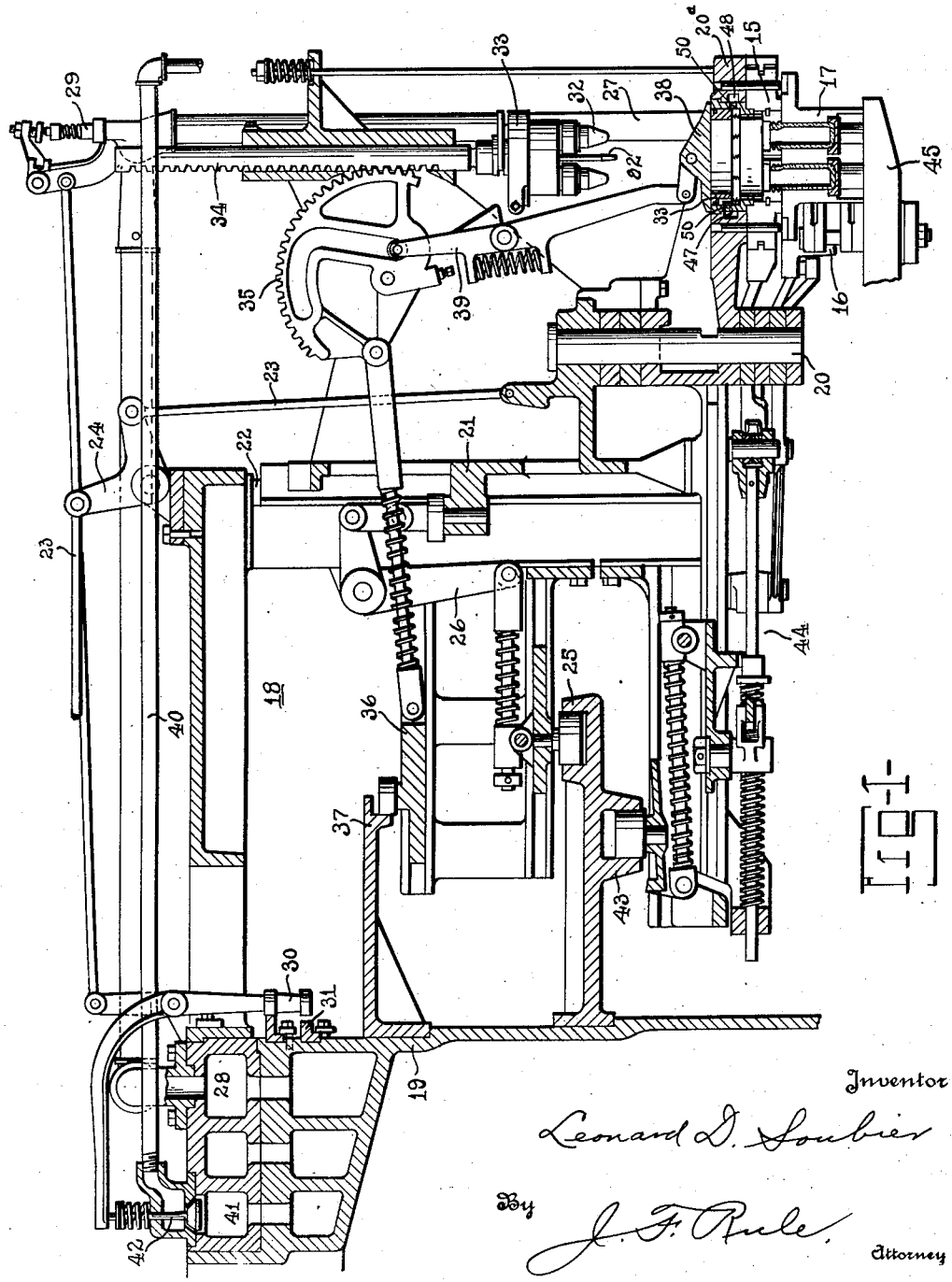
Inventor
Leonard D. Soubier
By J. F. Rule,
Attorney April 18, 1933.      L. D. SOUBIER      1,904,961
MACHINE FOR FORMING HOLLOW GLASSWARE
Filed June 19, 1931    5 Sheets-Sheet 2
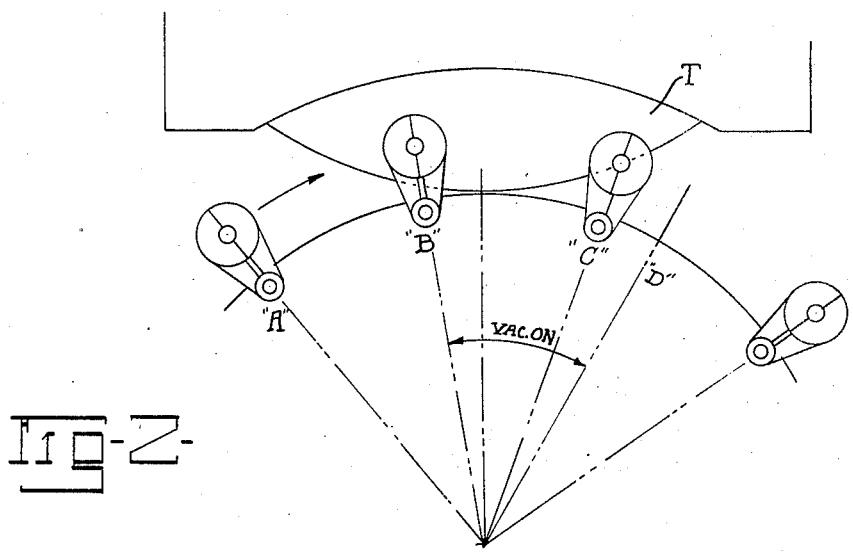
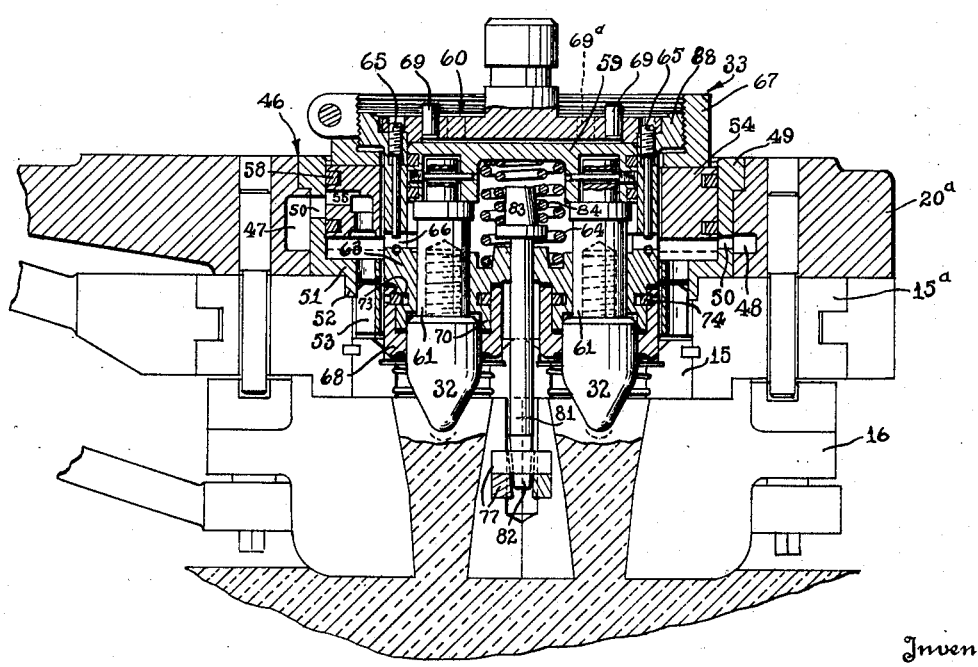

April 18, 1933.  L. D. SOUBIER  1,904,961
MACHINE FOR FORMING HOLLOW GLASSWARE
Filed June 19, 1931  5 Sheets-Sheet 3
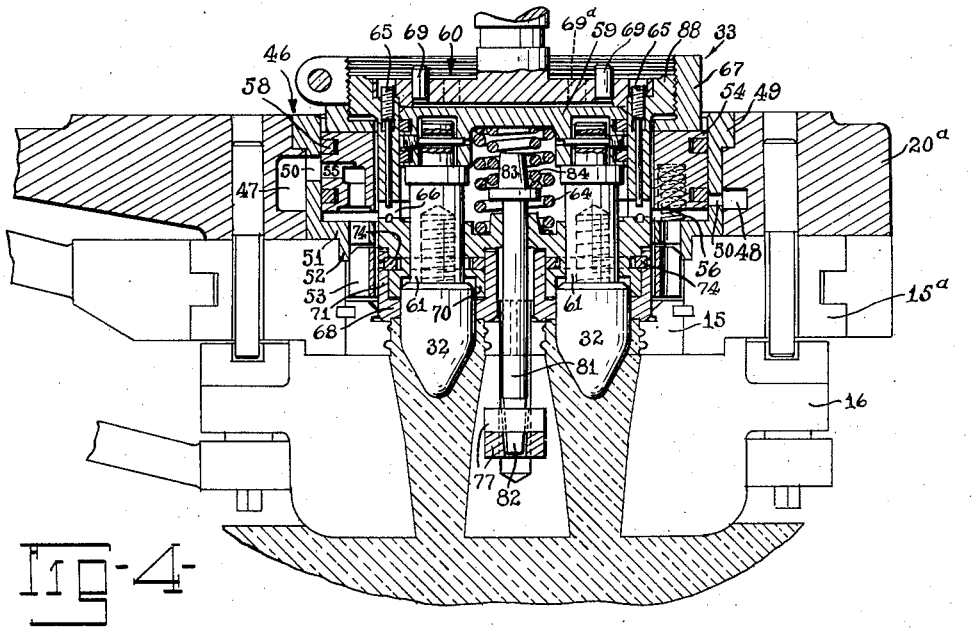
Fig-4-
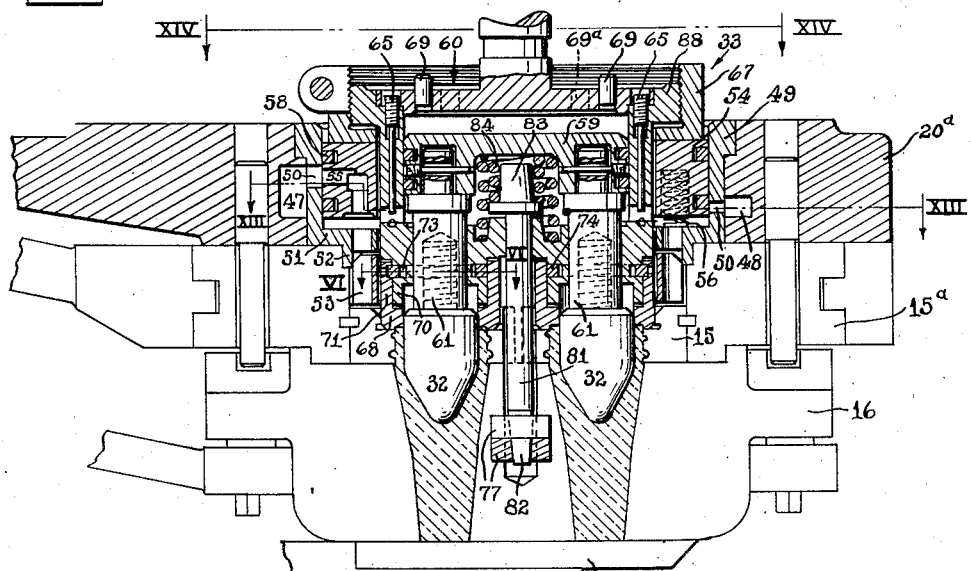
Fig-5-
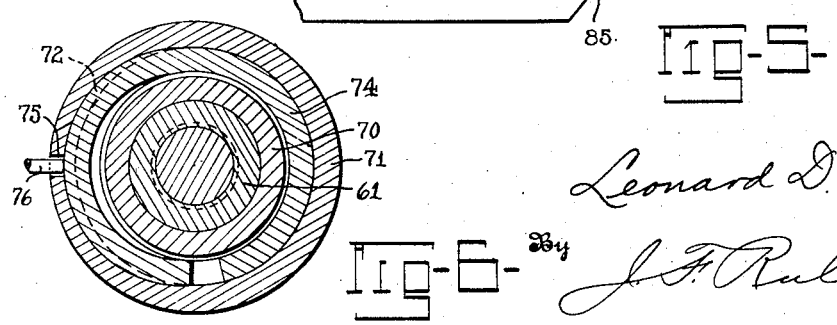
Fig-6-
Inventor
Leonard D. Soubier
By J. F. Rule
Attorney April 18, 1933. L. D. SOUBIER 1,904,961
MACHINE FOR FORMING HOLLOW GLASSWARE
Filed June 19, 1931 5 Sheets-Sheet 4
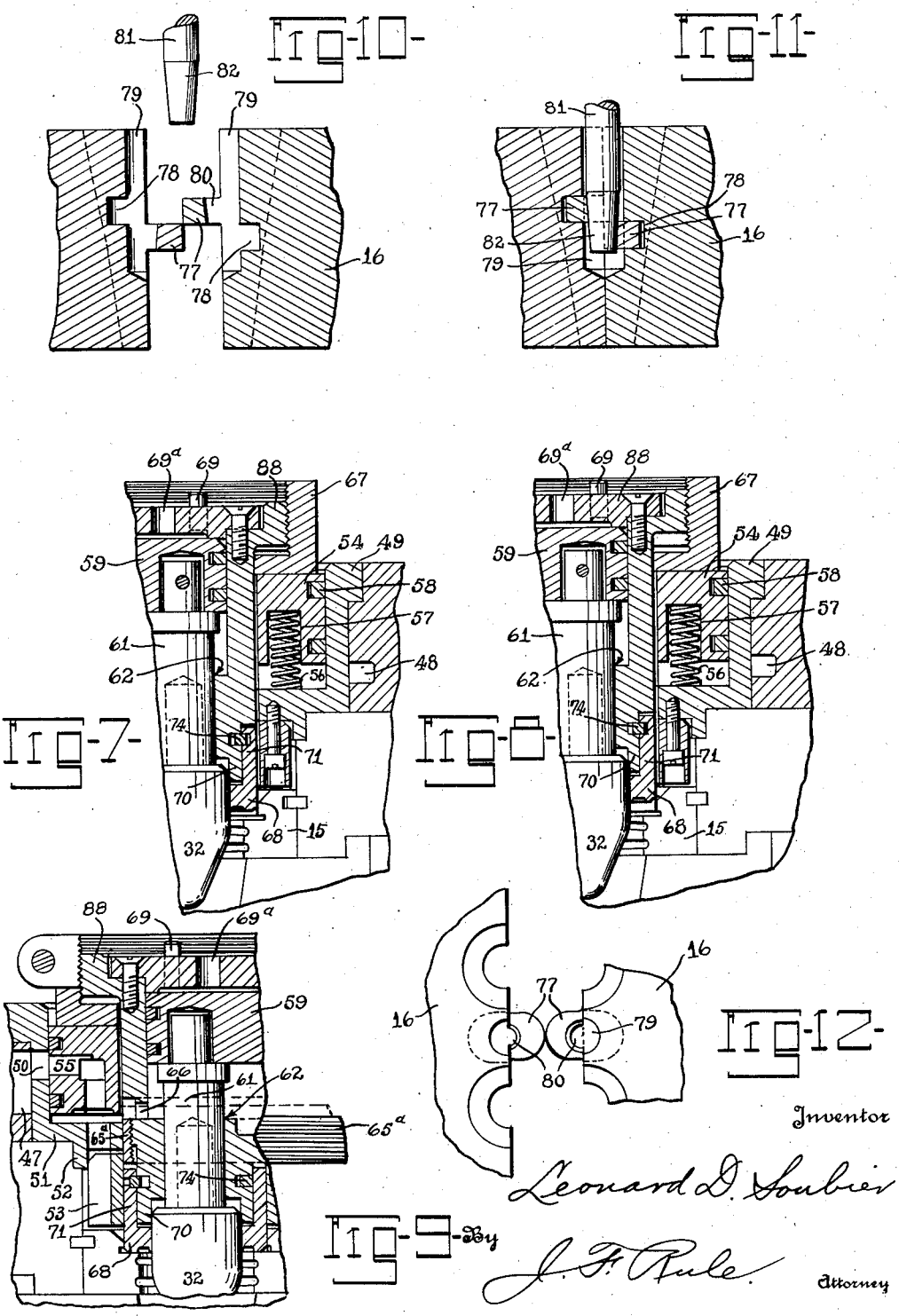

April 18, 1933.    L. D. SOUBIER    1,904,961
MACHINE FOR FORMING HOLLOW GLASSWARE
Filed June 19, 1931    5 Sheets-Sheet 5
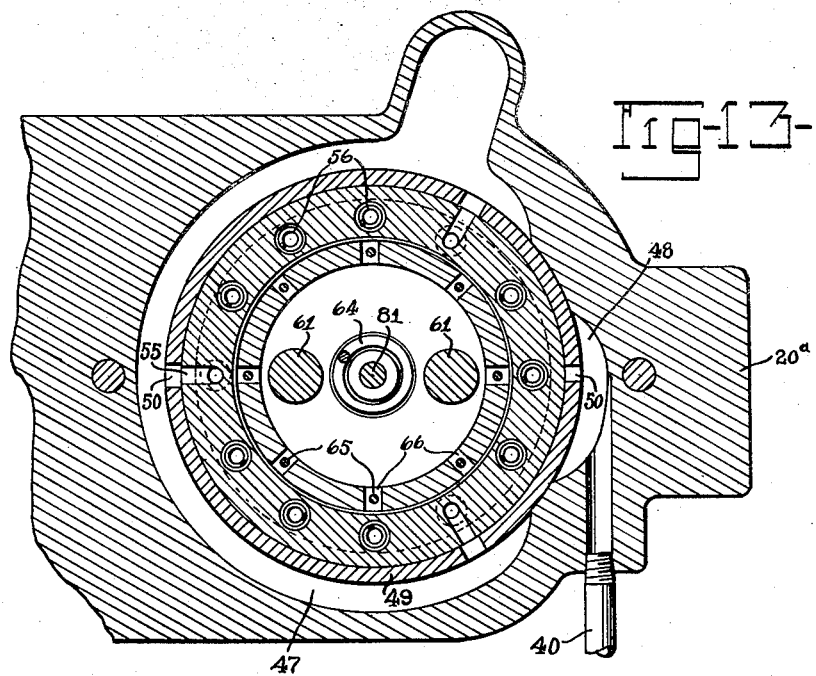
Fig-13-
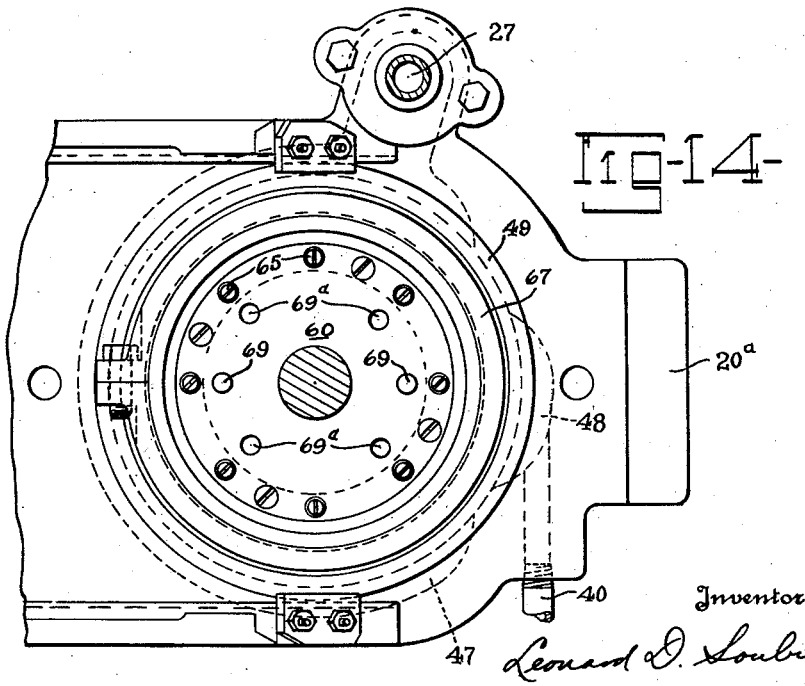
Fig-14-
Inventor
Leonard D. Soubier
By
J. F. Rule
Attorney Patented Apr. 18, 1933

1,904,961

UNITED STATES PATENT OFFICE

LEONARD D. SOUBIER, OF ALTON, ILLINOIS, ASSIGNOR TO OWENS-ILLINOIS GLASS COMPANY, A CORPORATION OF OHIO

MACHINE FOR FORMING HOLLOW GLASSWARE

Application filed June 19, 1931. Serial No. 545,502.

The present invention relates to improvements in machines for forming hollow glassware and more particularly to that type including an annular series of suction blank molds which gather their mold charges of molten glass from an exposed supply body and transform the mold charges into blanks or parisons which are then transferred to finishing molds for final shaping.

In machines of the above character, it is customary immediately following the charge gathering operation and while a cut-off knife is in mold closing position to apply a puff of air under pressure to the upper end of the blank mold cavities for the purpose of compacting or compressing the glass against the walls of said cavities. This operation is intended to cause such intimate contact between the blanks or parisons and the metal molds that an enamel or film of uniformly chilled glass is formed over the entire outer surface of said blanks or parisons. Also this puff of air under pressure is designed to materially increase the density of the glass structure. Such treatment of the glass at this stage of operations is necessary in order that uniform distribution of glass and proper wall thickness may be obtained in the finished articles.

An object of the present invention is the provision of novel improved means whereby the results indicated above as being essential to the production of high grade ware, may be obtained with a greater degree of regularity and certainty than where air under pressure alone is relied upon for compacting the glass. To this end the usual plungers which form a part of the machine construction even where air under pressure is employed for the glass compacting operation, are arranged so that they may be utilized as a glass compacting medium as well as a device to form an initial blow opening. Accordingly the plungers are projected into the blank mold cavities substantially simultaneously with the mold charging operation and immediately upon completion of the charging and usual cut-off operations are further projected into the molds for the purpose of firmly compressing or compacting the glass.

A far greater and more effective pressure on the glass may be obtained by using the plunger just described than by relying solely upon air under pressure.

Another object of the present invention is the provision of novel means actuated at least in part by the pressing movement of the plungers for securely locking the mold sections against premature separation.

A further object is the provision of vacuum operated mechanism for imparting the pressing movement to the plungers and readily adjustable means for controlling the speed at which said mechanism operates. Thus, either a quick or slow pressing operation may be obtained.

A further object is the provision of novel means for regularly controlling the time interval between positioning the plunger and finish ring for gathering and the actual application of vacuum to the mold cavities.

It is also an object to provide in an apparatus of the above character, a generally simplified construction facilitating removal and replacement of parts as well as obtaining various adjustments to meet different operating conditions.

Other objects will be in part apparent and in part pointed out hereinafter.

In the drawings:

Fig. 1 is a fragmentary vertical sectional elevation showing an adaptation of the present invention to one mold group of a modern Owens type bottle forming machine.

Fig. 2 is a diagrammatic plan view showing the various successive blank forming positions of the molds.

Fig. 3 is a detail sectional elevational view of one blank forming unit or mold at the beginning of the mold charging operation.

Fig. 4 is a view similar to Fig. 3 showing the next succeeding position assumed during the mold charging operation.

Fig. 5 is a sectional elevational view showing the plungers projected for the purpose of compressing or compacting the mold charges.

Fig. 6 is a sectional view taken along the line VI—VI of Fig. 5 showing the finish ring holder.

Fig. 7 is a detail sectional view showing one position of the plunger and holder relative to the head casting.

Fig. 8 is a view similar to Fig. 7 showing a high setting of the plunger holder whereby delayed seating of the finish ring with respect to the application of vacuum is obtained.

Fig. 9 is a detail sectional view showing the vacuum ports open and one of the plungers about to be projected for compressing the blank.

Figs. 10, 11, and 12 are views showing the mold locking device. Fig. 10 is a detail sectional view showing the mold sections spaced apart. Fig. 11 shows the mold sections in contact with each other and the tapered locking pin in position to hold them against premature separation. Fig. 12 is a plan view of the sections positioned as illustrated in Fig. 10.

Fig. 13 is a sectional view taken substantially along the line XIII—XIII of Fig. 5.

Fig. 14 is a sectional plan view taken substantially along the line XIV—XIV of Fig. 5.

The illustrated embodiment of my invention is shown in conjunction with the well known Owens suction type machine which includes an annular series of mold groups (Figs. 1 and 2) each consisting of a partible neck mold 15, a partible body blank mold 16, and a partible finishing mold 17. These mold groups are mounted upon a mold carriage 18 which is rotatably supported on a stationary central column 19, the latter carrying a series of stationary cams which will be referred to hereinafter. The neck and body blank molds 15 and 16 are mounted on a vertical hinge pin 20 at the inner end of the head casting 20ª, said pin being suitably connected to a slide 21 mounted in slideways 22 forming a part of the mold carriage 18. Counterweights or springs (not shown) operate through connector rods 23 and a bell crank lever 24 to normally hold said slide and neck and body blank molds in their uppermost positions. A stationary cam 25 mounted on the central column 19 operates through a bell crank lever 26 to move the dip slide and said molds downwardly at regular time intervals in opposition to the lifting influence of the spring or counterweights (not shown). Such downward movement of the molds is intended to bring the lower ends of the cavities into sealing contact with a supply body of glass from which mold charges are gathered by suction. Vacuum is applied to the neck and body blank mold cavities by way of the pipe 27 which is connected at one end to a vacuum chamber 28 and equipped with a vacuum control valve 29, the latter being operatively connected to a lever 30 which is rocked periodically by a stationary cam 31, the function of which is to open the valve while the corresponding blank mold is in contact with the supply body of glass. Plungers 32 mounted on a holder 33 are arranged for projection into the neck and body blank molds at regular time intervals for the purpose of forming the initial blow openings at the upper ends of the blanks and cooperating with the neck rings in giving proper shape to the neck portions of the articles being produced. The plungers, in accordance with the present invention are also employed in lieu of air under pressure for compacting the blanks. The mechanism for positioning the plungers within the neck and body blank molds consists of a rack bar 34 carried by the plunger holder 33 and meshing with a gear segment 35 which is suitably connected to a slide 36, the latter mounted for radial reciprocation on the mold carriage under the influence of a stationary cam 37. A blow slide 38 is connected through links 39 to said gear segment in such fashion that movement of the latter to raise the plungers 32 operates through said connectors to project the blow slide radially outward to a position in which it closes the upper ends of the neck molds. Air under pressure is supplied to each neck mold 15 after the latter is in register with the corresponding finishing mold 17. For this purpose a pipe 40 is connected at one end to an air supply chamber 41 while its other end communicates with the neck mold cavities as will be described hereinafter. A cam operated valve 42 is arranged to control the flow of air under pressure to said pipe 40.

A cam 43 (Fig. 1) operates through suitable mechanism 44 of conventional or any preferred form, to open the body blank mold 16 and then after the finishing mold is closed about the blanks, opens the neck mold, leaving the blanks or completely formed articles entirely supported in the finishing mold. The finishing mold may be supported on a finishing mold carrier 45 and operated in the usual or any preferred manner by mechanism (not shown). The above description sets forth substantially the conventional form of mold group or head found in the Owens suction type machine.

The present invention is particularly directed to the blank or parison forming unit and in more or less general terms involves projection of the plungers into the neck and body blank molds substantially simultaneously with the application of vacuum to said cavities and later imparting to the plungers an additional projecting movement whereby they are caused to firmly compact the glass in said molds so that the blanks or parisons formed by such operation will be of uniform density throughout. Such compacting of the glass by the plunger also causes such intimate contact between the glass and metal mold that a film or enamel of uniform thickness and viscosity is formed over the entire outer surface of the blanks.

The blank forming unit designed to operate as just briefly set forth, includes a construction substantially as follows: The head casting 20ª is provided with a vertical opening 46 axially aligned with the blank and neck molds and intended to receive valve mechanism and a plunger holder as will be described presently. The wall of this opening 46 (Figs. 3 and 13), which is of circular formation, is provided with a vacuum channel or chamber 47 extending a considerable distance about said opening and connected at one end to the vacuum pipe 27. A relatively short channel or chamber 48 (Figs. 3 and 13) is provided in the wall of said vertical opening 46 between the ends of the vacuum chamber 47 and communicates directly with the air supply pipe 40. Thus both air under pressure and vacuum are supplied to the head casting 20ª where their application to the mold cavities is controlled by valve mechanism (in addition to valves 42 and 29) which will be described presently.

The valve by means of which the application of vacuum and air under pressure are controlled in each head casting 20ª consists of a stationary sleeve 49 which is snugly fitted into the vertical opening 46, said sleeve provided with a series of radial ports 50 which provide communication between the interior of the sleeve and said vacuum and air chambers 47 and 48, respectively. It is to be noted (Figs. 3, 4, and 5) that the ports 50 opening into the vacuum chamber 47 are positioned so they communicate with the extreme upper portion of said vacuum chamber. The utility of such location of these ports will be apparent hereinafter. In the lower margin of the sleeve 49 there is formed an inwardly projecting horizontal flange 51 terminating in a downward extension 52 about which the neck mold carrier 15ª closes. Vertical openings 53 in this downward extension 52 provide part of means whereby air and vacuum may be alternately applied to the neck and blank mold cavities as will be apparent presently. A sleeve valve 54 is disposed within the stationary sleeve 49. This sleeve valve takes on the form of a ring having a series of ports 55 extending through the outer vertical face and lower face. These ports correspond in number and circumferential location to the ports 50 which open into the vacuum chamber 47, and as will be apparent presently, provide means whereby vacuum may be applied to the mold cavities as well as to mechanism for giving the plungers 32 a pressing movement. A series of coil springs 56 resting upon the horizontal flange 51 of the sleeve 49 project into recesses 57 in the lower side of the sleeve valve 54 and operate to normally and yieldingly hold said valve in its uppermost position (Fig. 1) wherein it closes the ports 50 leading to the vacuum chamber 47. Such closing of these ports and closing of the valve 29 effectively shuts off vacuum from the molds. Packing rings 58 on the sleeve valve 54 are designed to prevent loss of air or/and vacuum.

Movement of the plungers 32 and holder 33 therefor into and out of the head casting 20ª, controls the position of the sleeve valve 54 and thereby determines the periods of application of vacuum and air under pressure to the molds, as well as the time at which the pressing action of the plungers takes place. The construction involved comprises the plungers 32 individual to the blank mold cavities and separably connected to a piston 59 which is disposed within a cylinder 60. Rods 61 on the plungers 32 are mounted for vertical sliding movement in openings 62 in the lower end wall 63 of said cylinder. The piston 59 (Figs. 3, 4, and 5) to which the plungers are separably connected, is normally and yieldingly held at the upper end of the cylinder 60 by a coil spring 64 which is arranged between said piston and the lower end wall 63 of said cylinder. Vacuum is used to move the piston and plungers downwardly at regular time intervals for compacting the glass. The action of the vacuum is controlled and regulated by needle valves 65 which are adjustable to vary the effective area of the ports 66 in the side walls of the cylinder 60. These ports 66 are so positioned with respect to the sleeve valve 54 that they are at all times in direct communication with the ports 55 in said valve. An adjustable valve operating ring 67 (Figs. 3, 7, and 8) is threaded upon the upper end of the cylinder 60 and during operation of the apparatus is intended to seat upon the sleeve valve 54. The position of this valve operating ring on the cylinder 60 predetermines the position of the finish ring 68 at the time the ports 50 and 55 are brought into register with each other. The valve operating ring 67 is provided with internal screw threads engaging external threads on a radial flange 88 at the upper end of the cylinder 60. Diametrically opposed pin 69 at the upper end of the cylinder 60 may be engaged by a spanner wrench or similar tool by which relative rotary movement between the cylinder and ring may be obtained to change the setting of said ring by adjusting the valve operating ring 67 upwardly on the cylinder 60. It is obvious that the finish rings 68 will be completely seated upon the neck rings 15 or molds earlier with respect to complete registry of the ports 50 and 55 than where the stop ring occupies a lower position on the cylinder 60. The possibility of obtaining such adjustments is of considerable value in that it permits initial application of vacuum to the mold cavities through comparatively large unobstructed passageways until the mold cavities are substantially entirely filled with molten glass. During the time that the glass is moving upwardly into the mold cavities, the plungers and finish rings are moving downwardly. Thus when the cavities are substantially filled, said finish rings 68 are moved into such position with respect to the neck ring 15 or mold that the effective area of the vacuum passageways to the cavities is greatly reduced. Immediately the finish rings 68 are seated upon the neck rings 15 or molds. The size of the mold cavities is the main factor determining the seating of the valve operating ring 67. This is quite obvious in view of the fact that the greater the amount of glass to be lifted the longer should be the period of time of maximum opening of vacuum passageways.

The finish rings 68 are separably connected to the cylinder 60 in a fashion permitting ready and quick removal and/or replacement thereof. The construction (Fig. 6) includes a sleeve 70 depending from the lower end wall of the cylinder 60. The finish ring 68 includes a sleeve 71 which telescopes over said extension 70 and has an internal eccentric groove 72 near its upper end. This groove is intended to be radially aligned with a circular groove or channel 73 in which an expansible locking ring 74 is seated. This locking ring 74 (Figs. 5 and 6) when in operative position rests partly within both of the channels or grooves 72 and 73, thereby securely holding the finish ring 68 against accidental displacement. In order that the finish ring may be removed when necessary, the sleeve 71 thereon is provided with a radial opening 75 communicating with the groove 72. Any suitable instrument 76 may be inserted into this opening 75 for the purpose of compressing the locking ring 74 sufficiently to permit downward movement of the finish ring 68 relative to the extension 70 on the cylinder 60. Thus the finish rings may be easily removed and replaced.

For the purpose of securing the blank mold sections against premature separation during the pressing operation of the plungers 32 as will be described presently, a mold locking device operable by movement of the plungers 32 is employed. This locking device comprises a pair of horizontally disposed lugs 77 extending toward each other from the opposed meeting surfaces of the blank mold 16. A recess 78 is formed in each mold section to receive one of the lugs 77 when the mold is closed. A vertical groove 79 which is substantially semi-circular in cross section, extends vertically in each of the meeting faces of the mold sections and together with vertical channels 80 in the lugs, form an opening into which a tapered locking pin 81 is projected. This locking pin 81 is formed with a tapered lower end 82, which as shown in Fig. 11, engages similarly tapered surfaces constituting the walls of the channels or grooves 80. The locking pin 81 extends upwardly into the cylinder 60 and is provided at its upper end with a shouldered head 83 forming a seat for a coil spring 84. This spring is designed to yieldingly space the piston 59 from said locking pin 81 so that when said piston moves downwardly it must operate through the spring to force the locking pin into its operative position. This arrangement avoids the possibility of breaking parts of the locking device or applying an excessive pressure thereon.

In operation, the various elements making up a mold group or head are relatively positioned substantially as shown in Fig. 1 just prior to the time of arrival at the point "A" in Fig. 2. Substantially at the point "A" (Fig. 2) the blowing slide 38 (Fig. 1) is moved to an inoperative position and the finishing mold 17, swung downwardly as is customary, to clear the supply tank "T". The blank and neck molds are then closed as shown in Fig. 3 and the plungers and holders therefor are lowered substantially to the position shown in Fig. 3. At the point "B" (Fig. 2) the cam 25 (Fig. 1) operates to lower the mold into contact with the surface of the supply body of glass and immediately the cam 37 operates to further lower the plunger holder resulting in downward movement of the sleeve valve 54 so that vacuum is applied through the aligned ports 50 and 55 and vertical openings 53 in the downward extension 52 on the sleeve 49. Thus vacuum is applied to the neck and blank mold cavities with the result that the glass is sucked up into the mold cavities substantially as illustrated in Fig. 3. During raising of the glass into the cavities the cam 37 operates to project the plunger holder further into the opening in the head casting 20ª with the result that the finish rings 68 are brought into snug contact with the neck rings or molds 15. This also lowers the plungers a short distance. The vacuum having caused complete filling of the neck and blank mold cavities is now applied to the lower side of the piston 59 to which the plungers are connected and causes a slight downward movement of said pistons and plungers to substantially the position shown in Fig. 5. This operation results in a firm compacting of the glass in the neck and blank molds increasing with absolute uniformity with the density of the glass and causing such intimate contact between the glass and the metal molds that uniform chilling of the outer surface of the blank is obtained. During this pressing operation application of vacuum to the finish of the blank or parison is maintained to insure quick setting of the glass in the neck mold and prevent the plunger from pulling any portion of the glass out of said mold. By adjusting the needle valves 65, the effectiveness of the applied vacuum may be varied so that either a quick or comparatively slow steady pressing operation may be obtained. As the plunger holder moves downwardly for the purpose of compacting the glass, the locking pin 81 is projected into the openings in the lugs 77 thereby securely holding the mold sections against premature separation.

During movement of a mold group between points "B" and "C" (Fig. 2) vacuum is applied to the blank mold cavities, mold charges are gathered, and the cut-off knife 85 swung across the lower end of the corresponding mold to sever the excess glass therefrom and close the mold cavities. Substantially between the points "C" and "D" (Fig. 2) the vacuum causes downward movement of the plungers for the compacting operation as described above. The cut-off knife is then lowered and swung to one side of the mold in the customary manner. The vacuum is shut off by closing the valve 29. The spring 64 promptly acts to lift the piston 59 and retract the plungers 32. Vent openings 69ª in the cylinder 60 avoid compression of air above the piston 59. Immediately the blank mold opens and the finishing mold 17 is brought into position to enclose the blanks or parisons which are suspended from the neck molds. The cam 37 then operates to raise the plungers and their holders to the position shown in Fig. 1 and simultaneously projects the blow slide 38 to a position over the vertical opening in the head casting 20ª. Such removal of the plungers and holders therefrom allows the springs 56 to raise the sleeve valve 54 to the position shown in Fig. 1 where it closes the vacuum ports 50 and opens the single port 50 which leads to the air chamber 48. The valve 42 (Fig. 1) is immediately opened so that air under pressure flows through the pipe 40 to said chamber 48 and thence into the space between the blow slide and neck mold. Obviously this air under pressure is then directed into the initial blow openings in the upper ends of the blanks or parisons, causing expansion of the latter against the walls of the finishing mold cavities. Upon completion of this final blowing operation the neck molds are opened slightly due to an additional opening movement of the blank molds and the finishing mold is then lowered preparatory to discharging the finished articles at a predetermined position. Such discharge of the finished articles may be accomplished in the customary manner.

In Fig. 9 is shown another form of valve for regulating and controlling the application of vacuum to the cylinder 60. A ring or collar 65ª is threaded on the cylinder 60 just below the ports 66 and may be adjusted to increase or decrease the effective area of said ports.

Modifications may be resorted to within the spirit and scope of the appended claims.

What I claim is:

1. In combination, a neck mold, a blank mold in register therewith, a plunger, means for positioning the plunger in said molds, means for then applying vacuum to the molds to gather a mold charge of molten glass, means for closing one end of the blank mold, and vacuum operated means brought into activity after said closing of the end of the mold for causing a relative movement between said molds and plunger to compact the glass.

2. In combination, a neck mold, a blank mold in register therewith, said molds having aligned vertical cavities opening through the bottom end of the blank mold, a plunger, means for moving the plunger downward to an operative position within said mold cavities, means for applying vacuum to the aligned cavities while the plunger is in said position, a cut-off knife adapted to close the lower end of the blank mold cavities, and vacuum operated means whereby the plunger is given an additional downward movement in the aligned cavities while the cut-off knife is in mold closing position.

3. In combination, a neck mold, a blank mold in register therewith, said molds having aligned vertical cavities opening through the bottom end of the blank mold, a plunger cam operated means for moving the plunger downward to an operative position within said mold cavities, means for applying vacuum to the aligned cavities while the plunger is in said position, a cut-off knife adapted to close the lower end of the blank mold cavities, and means actuated by vacuum to cause additional downward movement of the plunger within the mold cavities while the cut-off knife is in mold closing position.

4. In combination, a neck mold, a blank mold in register therewith, a plunger, mechanical means for placing the plunger in an operative position in said molds, vacuum applying means for exhausting air from the molds and causing delivery of molten glass thereto, and vacuum operated means for imparting a glass compacting movement to the plunger.

5. In combination, a neck mold, a blank mold in register therewith, said molds having aligned cavities, a plunger, mechanical means for projecting the plunger into the cavities a predetermined distance, means for then applying vacuum to the molds to thereby fill the aligned cavities with molten glass, and means whereby continued operation of the vacuum applying means imparts movement to the plunger for compacting the glass in said aligned cavities.

6. In combination, a head casting having a vertical opening extending therethrough, cooperating blank and neck molds in register with said opening, a plunger holder, a plunger on said holder, means for projecting said holder and plunger through said opening and positioning the plunger in said molds, means for applying vacuum to the molds to thereby cause delivery of a charge of molten glass thereto, a valve arranged in said vertical opening for at least in part regulating the application of vacuum to said molds, and means whereby projection of the plunger and holder therefor a predetermined distance into the opening actuates said valve.

7. In combination, a head casting having a vertical opening extending therethrough, cooperating blank and neck molds in register with said opening, a plunger holder, a plunger on said holder, means for projecting said holder and plunger through said opening and positioning the plunger in said molds, means for applying vacuum to the molds to thereby cause delivery of a charge of molten glass thereto, a valve arranged in said vertical opening for at least in part regulating the application of vacuum to said molds, means whereby projection of the plunger and holder therefore a predetermined distance into the opening actuates said valve, said valve comprising a sleeve arranged for vertical sliding movement in said opening and having a series of radial ports therein, and a vacuum chamber formed in the head casting and extending at least partially around said opening and having ports therein adapted for alignment with the other ports at times.

8. In combination, a head casting having a vertical opening therethrough, a vacuum chamber extending at least partially around said opening and having ports leading to said opening, a sleeve valve mounted for vertical movement in said opening and having ports extending therethrough, spring devices normally and yieldingly positioning said valve to close the ports leading from the vacuum chamber, molds arranged beneath the head casting and aligned with the opening in the latter, a plunger, means for projecting the plunger into the molds, and means whereby projection of the plunger into the molds actuates said valve causing registry of the ports and application of vacuum to the molds.

9. In combination, a head casting having a vertical opening therethrough, a vacuum chamber extending at least partially around said opening and having ports leading to said opening, a sleeve valve mounted for vertical movement in said opening and having ports extending therethrough, spring devices normally and yieldingly positioning said valve to close the ports leading from the vacuum chamber, cooperating neck and blank molds beneath said head casting and in register with the opening therein, a plunger holder, a plunger mounted thereon, mechanical means for moving the holder and plunger into said opening to thereby position the plunger in said molds, and means whereby movement of the holder a predetermined distance into said vertical opening actuates said sleeve valve to cause register of the ports and application of vacuum to the molds.

10. In combination, a head casting having a vertical opening therethrough, a vacuum chamber extending at least partially around said opening and having ports leading to said opening, a sleeve valve mounted for vertical movement in said opening and having ports extending therethrough, spring devices normally and yieldingly positioning said valve to close the ports leading from the vacuum chamber, cooperating neck and blank molds beneath said head casting and in register with the opening therein, a plunger holder, a plunger mounted thereon, mechanical means for moving the holder and plunger into said opening to thereby position the plunger in said molds, a finish ring carried by said holder, and a valve operating ring mounted on the holder near its upper end and adjustable lengthwise thereof, said valve operating ring adapted to move the sleeve valve during projection of the plunger into the molds to thereby provide communication between said vacuum chamber and the molds.

11. In combination, a head casting having a vertical opening therethrough, a vacuum chamber extending at least partially around said opening and having ports leading to said opening, a sleeve valve mounted for vertical movement in said opening and having ports extending therethrough, spring devices normally and yieldingly positioning said valve to close the ports leading from the vacuum chamber, cooperating neck and blank molds beneath said head casting and in register with the opening therein, a plunger, a plunger holder comprising a vertical cylinder, a piston in said cylinder, means providing separable connection between the plunger and piston, mechanical means for moving the holder into the opening in said head casting thereby positioning the plunger within the molds, an adjustable valve operating ring carried by the holder and adapted to move the sleeve valve and thereby cause application of vacuum to the molds while the plunger is positioned therein, and means whereby vacuum is then applied to said cylinder causing downward movement of the piston and plunger relative to the molds.

12. In combination, a head casting having a vertical opening therethrough, a vacuum chamber extending at least partially around said opening and having ports leading to the opening, a sleeve valve mounted for vertical movement in said opening to alternately open and close said ports, cooperating neck and blank molds disposed below said head casting and in register with the vertical openings, a plunger arranged for projecting in the molds by way of the opening in said head casting, means whereby said projection of the plunger actuates the valve and thereby causes application of vacuum to the molds, and means operating after the initial application of vacuum to the molds to further project the plunger into said molds.

13. In combination, a head casting having a vertical opening therethrough, a vacuum chamber extending at least partially around said opening and having ports leading to the opening, a sleeve valve mounted for vertical movement in said opening to alternately open and close said ports, cooperating neck and blank molds disposed below said head casting and in register with said vertical opening, a plunger arranged for projection into the molds by way of the opening in said head casting, a holder for said plunger, said holder including a piston connected to the plunger and movable with respect to the remaining portions of the holder, and means operating after the initial application of vacuum to the molds to apply vacuum to said piston and thereby cause further projection of the plunger into the mold.

14. In combination, a head casting having a vertical opening therethrough, a vacuum chamber extending at least partially around said opening and having ports leading to the opening, a sleeve valve mounted for vertical movement in said opening to alternately open and close said ports, cooperating neck and blank molds disposed below said head casting and in register with said vertical opening, a plunger arranged for projection into the molds by way of the opening in said head casting, a holder for said plunger, said holder including a piston connected to the plunger and movable with respect to the remaining portions of the holder, means operating after the initial application of vacuum to the molds to apply vacuum to said piston and thereby cause further projection of the plunger into the mold, and adustable means for regulating the rate of speed at which said further projection of the plunger is effected.

15. In combination, a head casting having a vertical opening therethrough, a vacuum chamber extending at least partially around said opening and having ports leading to the opening, a sleeve valve mounted for vertical movement in said opening to alternately open and close said ports, cooperating neck and blank molds disposed below said head casting and in register with said vertical opening, a plunger arranged for projection into the molds by way of the opening in said head casting, a holder for said plunger, said holder including a piston connected to the plunger and movable with respect to the remaining portions of the holder, means operating after the initial application of vacuum to the molds to apply vacuum to said piston and thereby cause further projection of the plunger into the mold, and spring means normally and yieldingly retaining the plunger carrying piston against movement with respect to the remaining portions of the holder.

16. In combination, a neck mold, a blank mold in register therewith, a holder for a plunger and finish ring, a plunger connected to the holder, a finish ring encircling the plunger and connected to said holder, a valve operating ring carried at the end of the holder opposite said finish ring, means for moving the holder to thereby operatively position the plunger and finish ring relative to said molds, and means for applying vacuum to the molds, said vacuum applying means including a valve adapted to be opened by said valve operating ring during projection of the plunger and finish ring to their operating positions.

17. In combination, a neck mold, a blank mold in register therewith, a holder for a plunger and finish ring, a plunger connected to the holder, a finish ring encircling the plunger and connected to said holder, a valve operating ring carried at the end of the holder opposite said finish ring, means for moving the holder to thereby operatively position the plunger and finish ring relative to said molds, means for applying vacuum to the molds, said vacuum applying means including a valve adapted to be opened by said valve operating ring during projection of the plunger and finish ring to their operating positions, and means causing relative movement between the plunger and finish ring after said application of vacuum to the molds for projecting the plunger further into said molds.

18. In combination, a neck mold, a blank mold in register therewith, a holder for a plunger and finish ring, a plunger connected to the holder, a finish ring encircling the plunger and connected to said holder, a valve operating ring carried at the end of the holder opposite said finish ring, means for moving the holder to thereby operatively position the plunger and finish ring relative to said molds, means for applying vacuum to the molds, said vacuum applying means including a valve adapted to be opened by said valve operating ring during projection of the plunger and finish ring to their operating positions, and means for varying the spaced relation between said valve operating ring and finish ring to thereby correspondingly change the time intervals between the application of vacuum to the molds and operative positioning of the finish ring relative to the molds.

19. In combination, a neck mold, a blank mold in register therewith, a holder for a plunger and finish ring, a plunger connected to the holder, a finish ring encircling the plunger and connected to said holder, a valve operating ring carried at the end of the holder opposite said finish ring, means for moving the holder to thereby operatively position the plunger and finish ring relative to said molds, means for applying vacuum to the molds, said vacuum applying means including a valve adapted to be opened by said valve operating ring during projection of the plunger and finish ring to their operating positions, means for varying the spaced relation between said valve operating ring and finish ring to thereby correspondingly change the time interval between the application of vacuum to the molds and operative positioning of the finish ring relative to the molds, and means employing vacuum to project the plunger further into the molds after the initial application of vacuum to the latter.

20. A partible two-section mold having a plurality of cavities therein, plungers individual to the cavities, a holder for the plungers, means for projecting the plungers into said cavities, a locking device including a locking pin and means on the meeting faces of the mold sections to interlock with said pin for securing the mold against premature opening, and means whereby projection of the plungers into said cavities moves the locking pin into locking position.

21. A partible two-section mold having a plurality of cavities therein, plungers individual to the cavities, a holder for the plungers, means for projecting the plungers into said cavities, a locking device for securing the mold against premature opening, means whereby projection of the plungers into said cavities directly controls actuation of the locking device, said locking device including overlapping lugs on adjacent meeting faces of the mold sections, each of said lugs having a vertical opening therein, a tapered locking pin adapted for projection into the openings to draw the mold sections together, and means whereby downward movement of the plunger causes projection of the pin into said openings.

22. A partible two-section mold having a plurality of cavities therein, plungers individual to the cavities, a holder for the plungers, means for projecting the plungers into said cavities, a locking device for securing the mold against premature opening, means whereby projection of the plungers into said cavities directly controls actuation of the locking device, said locking device including overlapping lugs on adjacent meeting faces of the mold sections, each of said lugs having a vertical opening therein, a tapered locking pin adapted for projection into the openings to draw the mold sections together, means whereby downward movement of the plunger causes projection of the pin into said openings, said pin mounted on the holder for vertical movement relative thereto, and a spring device arranged to yieldingly retain the pin in its lowermost position with respect to the holder.

Signed at Alton, Illinois, this 16th day of June, 1931.

LEONARD D. SOUBIER.